Oct. 22, 1929.　　　S. M. DAHL　　　1,733,007
SUMMER TOP FOR AUTOMOBILES
Filed Sept. 5, 1928
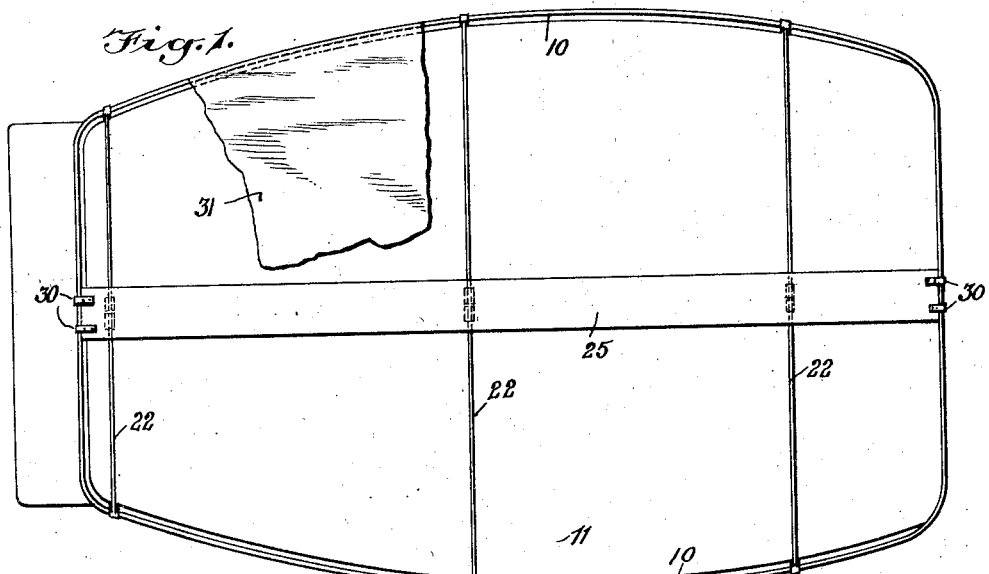
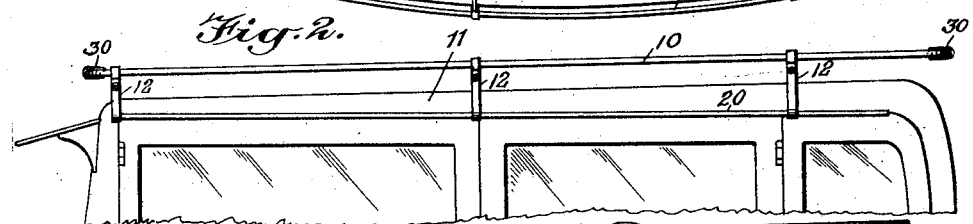
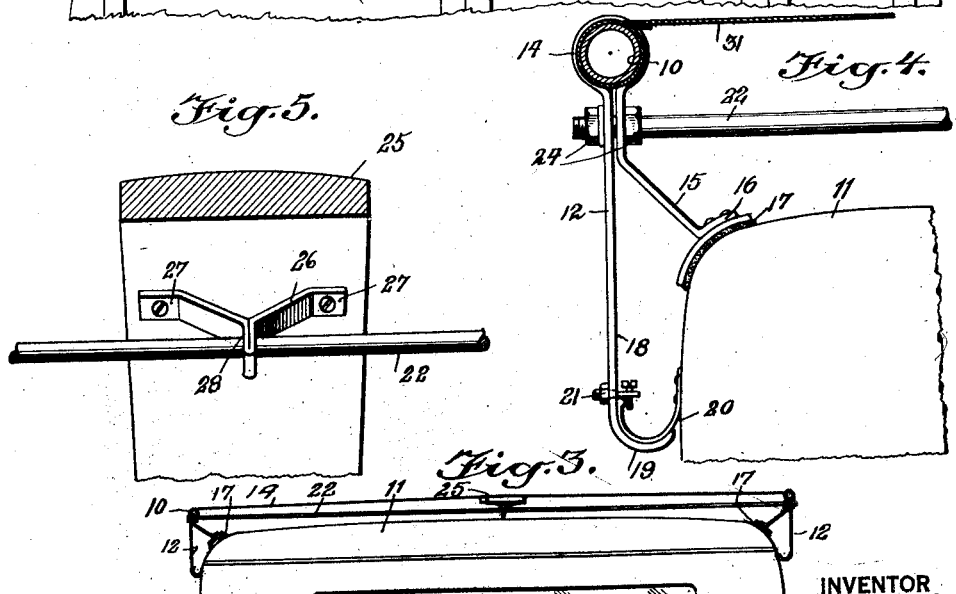
INVENTOR
Sigurd M. Dahl
BY
ATTORNEY
WITNESSES Patented Oct. 22, 1929

1,733,007

UNITED STATES PATENT OFFICE

SIGURD M. DAHL, OF WHITE PLAINS, NEW YORK

SUMMER TOP FOR AUTOMOBILES

Application filed September 5, 1928. Serial No. 304,065.

This invention relates to auxiliary vehicle coverings.

It is an object of the present invention to provide a novel and improved summer top or auxiliary covering for automobiles of the closed type.

It is another object of the invention to provide an auxiliary cover for automobiles which is adapted to extend over the roof of the automobile in slightly spaced relation thereto, whereby the auxiliary top will receive the direct impingement of the sun's rays, and thus protect the automobile top from blistering and damage received therefrom.

It is a further object of the invention to provide a spaced auxiliary automobile top which is adapted to provide between the normal top and the auxiliary top an air space through which air may freely circulate, and which thus maintains the top cool and thus increases the comfort of the passengers.

A further object of the invention includes the provision of an improved supporting structure adapted to support in spaced relation to the top of an automobile an auxiliary top, the structure being readily applicable and removable, and which will be cheap and easy to manufacture, and which will be extremely durable.

Numerous other objects and features of the invention will be apparent from a consideration of the following specification taken in connection with the drawings, in which—

Fig. 1 is a top plan view of my present invention applied to an automobile of the conventional sedan type.

Fig. 2 is a side elevation of the invention as applied to the automobile shown in Fig. 1.

Fig. 3 is a rear view of my invention as applied to Figs. 1 and 2.

Fig. 4 is a detail sectional view of the supporting frame forming part of the present invention.

Fig. 5 is a detail sectional view illustrating the structure and application of the longitudinally extending central supporting board of my present invention.

Referring more particularly to the drawings, the invention includes the provision of a peripheral frame 10 which may be formed of tubular pipe or other suitable frame material. The frame 10 is preferably supported in spaced relation to the top 11 of an automobile by the provision of preformed metal supporting members 12 which are adapted to circumvent member 10 as at 14 and depend downwardly therefrom, one end terminating in a leg 15 provided with a shoe 16 preferably lined as at 17 with a cushioning material abutting the edge of the top 11, and thus assisting in maintaining member 10 in proper elevated relation. The opposite leg 18 of the member 12 is adapted to extend downwardly; this extremity being curved as at 19 to be received under the conventional door gutter 20.

A projecting member 21 is provided on the leg 18 and is adapted to extend over the door gutter 20, and thus assist in maintaining the leg 18 in proper relation with respect thereto. The members 12 are preferably positioned directly opposite each other in spaced relation along the sides of the vehicle top 11.

Extending between the oppositely disposed members 12, a transversely extending tie rod 22 is provided, which is adapted to extend through legs 15 and 18 of the member 12, and be secured thereto by the provision of oppositely embracing threaded members 24. Intermediate the ends of the tie rods 22, they are adapted to support a centrally longitudinally extending center board 25, the upper surface of which is slightly rounded and the lower surface of which is provided with a plurality of supporting cleats 26 which terminate in apertured ends 27, by means of which the cleats are secured in the board 25 as by the use of screws or the like. Intermediate the ends of the member 26, a portion is bent downwardly as at 28 and is apertured to receive therethrough a tie rod 22. The extremities of the board 25 are preferably secured to the end portions of the frame 10 by suitable connecting members 30 as illustrated in Fig. 1.

Secured to the frame 10 a suitable covering, preferably of flexible water-proofing material, such as canvas or the like, is provided as illustrated at 31 in the drawings. The covering 31 may be preferably secured in any desired manner to the frame 10 as by stitching as illustrated in Fig. 4, or if desired, suitable hooks 30 may be provided which will permit the ready removal and application of the covering 31 to the frame 10.

The upper surface of the center board 25 is adapted to assist in supporting the covering 31 and securing it in spaced relation to the top 11 of the vehicle. The upper rounded surface of the center board 25 is adapted to conform with the curve which the covering 31 assumes in being supported thereby.

Thus it may be readily seen that the invention provides for improved auxiliary auto tops which may be readily secured to or removed from a vehicle of conventional design, and which will prevent the direct rays of the sun or the direct impact of rain upon the roof of the vehicle, whereby damage thereto will be prevented and excessive heat within the car prevented.

It will be readily understood that numerous changes and modifications of the structural features of my invention may be resorted to without departing from the spirit or scope of the appended claims.

I claim:

1. In combination with a vehicle top including a door gutter, an auxiliary top support, said support including an arm arranged for association with the top of the vehicle, and an arm arranged for engagement with a side member of the vehicle, said last-mentioned arm having a curved portion engageable under the door gutter.

2. In combination with a vehicle top including a door gutter, an auxiliary top support, said support including an arm arranged for association with the top of the vehicle, an arm arranged for engagement with a side member of the vehicle, said last-mentioned arm having a curved portion engageable under the door gutter, and a co-operating member engageable over the door gutter.

3. In combination with a vehicle top including a door gutter, an auxiliary top support, said support including an arm arranged for association with the top of the vehicle, an arm arranged for engagement with a side member of the vehicle, said last-mentioned arm having a curved portion engageable under the door gutter, and a co-operating member engageable over the door gutter, said co-operating member being adjustable.

SIGURD M. DAHL.